US009982520B2

(12) United States Patent
Collins et al.

(10) Patent No.: US 9,982,520 B2
(45) Date of Patent: May 29, 2018

(54) OIL RECOVERY METHOD

(71) Applicant: BP EXPLORATION OPERATING COMPANY LIMITED, Middlesex (GB)

(72) Inventors: Ian Ralph Collins, Middlesex (GB); Arnaud Lager, Abu Dhabi (AE)

(73) Assignee: BP EXPLORATION OPERATING COMPANY LIMITED, Middlesex (GB)

( * ) Notice: Subject to any disclaimer, the term of this patent is extended or adjusted under 35 U.S.C. 154(b) by 3 days.

(21) Appl. No.: 14/905,084

(22) PCT Filed: Jul. 15, 2014

(86) PCT No.: PCT/EP2014/065180
§ 371 (c)(1),
(2) Date: Jan. 14, 2016

(87) PCT Pub. No.: WO2015/007749
PCT Pub. Date: Jan. 22, 2015

(65) Prior Publication Data
US 2016/0160621 A1 Jun. 9, 2016

(30) Foreign Application Priority Data
Jul. 17, 2013 (EP) .................................... 13176942

(51) Int. Cl.
*E21B 43/20* (2006.01)
*C09K 8/58* (2006.01)

(52) U.S. Cl.
CPC ............... *E21B 43/20* (2013.01); *C09K 8/58* (2013.01)

(58) Field of Classification Search
None
See application file for complete search history.

(56) References Cited

U.S. PATENT DOCUMENTS

| | | | |
|---|---|---|---|
| 2,204,620 A | 6/1940 | Prutton et al. | |
| 3,795,276 A | 3/1974 | Eilers et al. | |
| 3,949,811 A | 4/1976 | Threlkeld et al. | |
| 4,140,183 A | 2/1979 | Holm | |
| 4,147,211 A | 4/1979 | Sandiford | |
| 4,230,183 A | 10/1980 | Kalfoglou | |
| 4,233,165 A | 11/1980 | Salathiel et al. | |
| 4,265,311 A | 5/1981 | Ely | |
| 4,301,867 A | 11/1981 | Sydansk et al. | |
| 4,359,391 A | 11/1982 | Salathiel et al. | |
| 4,440,651 A | 4/1984 | Weisrock | |
| 4,478,283 A * | 10/1984 | Sydansk | C09K 8/607 166/292 |
| 4,498,539 A | 2/1985 | Bruning | |
| 4,498,540 A | 2/1985 | Marrocco | |
| 4,544,032 A | 10/1985 | Echols | |
| 4,570,710 A | 2/1986 | Stowe | |
| 4,606,407 A | 8/1986 | Shu | |
| 4,629,747 A | 12/1986 | Wu et al. | |
| 4,643,255 A | 2/1987 | Sandiford et al. | |
| 4,657,944 A | 4/1987 | Bruning et al. | |
| 4,665,194 A | 5/1987 | Marrocco | |
| 4,665,987 A | 5/1987 | Sandiford et al. | |
| 4,666,957 A | 5/1987 | Marrocco | |
| 4,683,954 A | 8/1987 | Walker et al. | |
| 4,754,809 A | 7/1988 | van Zanten et al. | |
| 4,762,625 A | 8/1988 | Dadgar | |
| 4,784,779 A | 11/1988 | Dadgar | |
| 4,787,452 A | 11/1988 | Jennings, Jr. | |
| 4,796,700 A | 1/1989 | Sandiford et al. | |
| 4,844,158 A | 7/1989 | Jennings, Jr. | |
| 4,867,238 A * | 9/1989 | Bayless | E21B 43/243 166/261 |
| 4,883,124 A | 11/1989 | Jennings, Jr. | |
| 4,939,203 A | 7/1990 | Marrocco | |
| 4,971,157 A | 11/1990 | Bollinger et al. | |
| 5,123,488 A | 6/1992 | Jennings, Jr. | |
| 5,253,711 A | 10/1993 | Mondshine | |
| 5,307,875 A | 5/1994 | Jennings, Jr. | |
| 5,327,973 A | 7/1994 | Jennings, Jr. | |
| 5,339,904 A | 8/1994 | Jennings, Jr. | |
| 5,342,530 A | 8/1994 | Aften et al. | |
| 5,366,016 A | 11/1994 | Fieler et al. | |

(Continued)

FOREIGN PATENT DOCUMENTS

| CA | 734971 A | 5/1966 |
|---|---|---|
| CA | 2090193 A1 | 8/1993 |

(Continued)

OTHER PUBLICATIONS

Petrick, S.A., et al; "Report No. 2 Greases for Use over the Tempature Range −65° C. to +100° C."; *Selected Government Research Reports, vol. II, Lubricants and Lubrication*, Issued by the Ministry of Supply Published for the Technical Information and Documents Unit of the Department of Scientific and Industrial Research by Her Majesty's Stationery Office, 11 pgs. (1952).
Chemicals from Salt (Halophilic) Microbes; Final Report, National Science Foundation by Benemann, et al; *Enbio, Inc.*, 25 pgs., May 30, 1982.

*Primary Examiner* — William D Hutton, Jr.
*Assistant Examiner* — Andrew Sue-Ako
(74) *Attorney, Agent, or Firm* — Conley Rose, P.C.

(57) ABSTRACT

A method for recovering crude oil from a reservoir that is penetrated by at least one injection well, the method comprising: injecting an aqueous displacement fluid comprising a solution of a zinc salt in an aqueous base fluid into the reservoir from the injection well wherein the aqueous base fluid has a total dissolved solids (TDS) concentration in the range of 200 to 250,000 ppmv (parts per million based on the volume of the aqueous base fluid), and a viscosity in the range of 1.00 to 2.00 centipoise (cP) at standard temperature and pressure; and wherein the aqueous displacement fluid has a dissolved zinc concentration in the range of 10 to 3,750 ppmv.

40 Claims, No Drawings

(56) References Cited

U.S. PATENT DOCUMENTS

| | | |
|---|---|---|
| 5,377,758 A | 1/1995 | Fieler et al. |
| 5,575,335 A | 11/1996 | King |
| 5,582,250 A | 12/1996 | Constien |
| 6,100,222 A | 8/2000 | Vollmer et al. |
| 6,138,755 A | 10/2000 | Swartwout |
| 6,187,839 B1 | 2/2001 | Eoff et al. |
| 6,725,926 B2 | 4/2004 | Nguyen et al. |
| 7,398,824 B1 | 7/2008 | Wang et al. |
| 7,399,323 B2 | 7/2008 | Renninger et al. |
| 7,484,560 B2 | 2/2009 | Lal et al. |
| 7,588,085 B2 | 9/2009 | Acock et al. |
| 7,595,281 B2 | 9/2009 | McDaniel et al. |
| 7,622,431 B2 | 11/2009 | Muir |
| 7,691,792 B1 | 4/2010 | Fisher et al. |
| 7,846,222 B2 | 12/2010 | Renninger et al. |
| 2002/0039972 A1 | 4/2002 | Allan et al. |
| 2003/0083205 A1 | 5/2003 | Crews |
| 2003/0236174 A1 | 12/2003 | Fu et al. |
| 2004/0023812 A1 | 2/2004 | England et al. |
| 2004/0162224 A1 | 8/2004 | Nguyen et al. |
| 2005/0061502 A1 | 3/2005 | Hanes, Jr. et al. |
| 2005/0067164 A1 | 3/2005 | Ke et al. |
| 2006/0090393 A1 | 5/2006 | Rowland et al. |
| 2007/0060482 A1 | 3/2007 | Welton et al. |
| 2007/0107897 A1 | 5/2007 | Dahanayake et al. |
| 2007/0111897 A1* | 5/2007 | Dahanayake ............ C09K 8/08 507/211 |
| 2007/0175635 A1 | 8/2007 | Ke et al. |
| 2007/0246426 A1* | 10/2007 | Collins ................ C09K 8/528 210/651 |
| 2007/0281873 A1 | 12/2007 | Okada |
| 2007/0284101 A1 | 12/2007 | Valeriano et al. |
| 2008/0078545 A1 | 4/2008 | Welton et al. |
| 2008/0271888 A1 | 11/2008 | Huang et al. |
| 2010/0012331 A1* | 1/2010 | Larter .................... C09K 8/58 166/401 |
| 2010/0069271 A1 | 3/2010 | Valeriano et al. |
| 2010/0081585 A1 | 4/2010 | Fallon |
| 2011/0030958 A1 | 2/2011 | Fedorov et al. |
| 2011/0146973 A1 | 6/2011 | Olguin Lora et al. |
| 2011/0306525 A1* | 12/2011 | Lighthelm ............... C09K 8/58 507/225 |
| 2012/0143579 A1* | 6/2012 | Collins .................. G05B 17/02 703/10 |

FOREIGN PATENT DOCUMENTS

| | | |
|---|---|---|
| CA | 2 354 789 A1 | 8/2002 |
| EP | 0 134 014 A2 | 3/1985 |
| EP | 0 280 083 A1 | 8/1988 |
| EP | 0 845 520 A1 | 6/1996 |
| EP | 1 533 362 A1 | 5/2005 |
| EP | 1 617 039 A1 | 1/2006 |
| GB | 2 038 907 A | 7/1980 |
| GB | 2 145 420 A | 3/1985 |
| GB | 2 369 367 A | 5/2002 |
| NL | 6 617 322 A | 3/1968 |
| RU | 2 078 203 C1 | 4/1997 |
| RU | 2 196 883 C2 | 10/2002 |
| WO | WO 94/15070 A1 | 7/1994 |
| WO | WO 99/21902 A1 | 5/1999 |
| WO | WO 01/02698 A1 | 1/2001 |
| WO | WO 03/048267 A1 | 6/2003 |
| WO | WO 03/097995 A1 | 11/2003 |
| WO | WO 03/099890 A2 | 12/2003 |
| WO | WO 2005/119004 A1 | 12/2005 |
| WO | WO 2006/099250 A1 | 9/2006 |
| WO | WO 2008/029124 A1 | 3/2008 |
| WO | WO 2012/091599 A1 | 7/2012 |
| WO | WO 2012/141784 A1 | 10/2012 |

* cited by examiner

OIL RECOVERY METHOD

This application is the U.S. national phase of International Application No. PCT/EP2014/065180 filed Jul. 15, 2014 which designated the U.S. and claims priority to European Patent Application No. 13176942.4 filed Jul. 17, 2013, the entire contents of each of which are hereby incorporated by reference.

The present invention relates to a method for injecting an aqueous solution of a zinc salt into a reservoir for recovery of crude oil therefrom.

It has long been known that only a portion of the oil can be recovered from an oil-bearing reservoir as a result of the natural energy of the reservoir. So-called secondary recovery techniques are used to recover additional oil from a reservoir, the simplest method of which is by direct replacement with another medium, usually water or gas.

Waterflooding is one of the most successful and extensively used secondary recovery methods. Water is typically injected, under pressure, into reservoir rocks via injection wells, driving the oil through the rock towards production wells. The water used in waterflooding may be a high salinity water, for example, seawater, estuarine water, an aquifer water, or a produced water (water separated from oil and gas at a production facility).

The water used in waterflooding may also be a low salinity water. Thus, International Patent Application No. WO/2008/029124 teaches that oil recovery from a reservoir comprising an oil-bearing sandstone rock formation is enhanced (in comparison with injection of a high salinity water) when the injection water has a total dissolved solids content in the range of 200 to 12,000 ppmv and the ratio of the multivalent cation content of the injection water to that of the connate water contained within the sandstone rock is less than 1.

U.S. Pat. No. 5,123,488 relates to a method for improved displacement efficiency where two horizontal wells are used to remove hydrocarbonaceous fluids from a formation oil reservoir. A first liquid immiscible with hydrocarbonaceous fluids contained in the formation is injected into a lower horizontal well. This first liquid has a specific gravity greater than that of the hydrocarbonaceous fluids which causes the hydrocarbonaceous fluids to be displaced upwardly in the formation. Thereafter, a second liquid having a specific gravity greater than the first liquid is injected into a lower horizontal well. This causes the first liquid and hydrocarbonaceous fluids to be displaced upwardly toward a second horizontal well. Thereafter, hydrocarbonaceous fluids are removed from the formation by the upper horizontal well. Suitable displacing liquids are said to include seawater, brackish water, brine solutions, and mixtures thereof. It is also taught that zinc chloride and zinc bromide may be used to form salt solutions. Table 1 of U.S. Pat. No. 5,123,488 lists examples of suitable high density fluids including: $ZnCl_2$ solutions having concentrations of 2, 4, 8, 12 and 70 (sat.) % by weight corresponding to specific gravities at 20° C. of 1.0167, 1.0350, 1.0715, 1.1085 and 1.9620; sodium chloride brines having concentrations of between 2 and 26 (sat.) % by weight corresponding to specific gravities at 20° C. of between 1.0144 and 1.2025; potassium chloride brines having concentrations of between 2 and 24 (sat.) % by weight corresponding to specific gravities at 20° C. in the range of 1.0110 and 1.1623; and calcium chloride brines having concentrations of between 2 and 40 (sat.) % by weight corresponding to specific gravities at 20° C. in the range of 1.0148 and 1.3957. The method of U.S. Pat. No. 5,123,488 therefore relies on the high densities of the first and second immiscible liquids to displace the hydrocarbonaceous fluids upwardly in the reservoir.

Surprisingly, it has now been found that the residual oil saturation of an oil-bearing reservoir rock, in particular, a sandstone rock, may be reduced by injecting into the reservoir rock an aqueous displacement fluid comprising a solution of a zinc salt in an aqueous base fluid wherein the aqueous base fluid (into which the zinc salt is dosed to form the aqueous displacement fluid) has a total dissolved solids concentration in the range of 200 to 250,000 ppmv and the resulting aqueous displacement fluid has a low concentration of dissolved zinc. This reduction in residual oil saturation is in comparison with a waterflood using the aqueous base fluid in the absence of added zinc salt (i.e. zinc salt is not dosed into the aqueous base fluid). By "low concentration of dissolved zinc" is meant that the aqueous displacement fluid has, for example, a dissolved zinc concentration of up to 0.375 weight % (3,750 ppm) and, preferably, a dissolved zinc concentration of at least 0.001 weight % (10 ppm). Surprisingly, it has also been found that incremental oil recovery increases with increasing ratio of the Ionic Strength of the aqueous displacement fluid to the molar concentration of dissolved zinc (and with increasing molar ratio of dissolved chloride to dissolved zinc) in the aqueous displacement fluid.

Thus, according to the present invention there is provided a method for recovering crude oil from a reservoir that is penetrated by at least one injection well, the method comprising:
injecting an aqueous displacement fluid comprising a solution of a zinc salt in an aqueous base fluid into the reservoir from the injection well wherein the aqueous base fluid has a total dissolved solids (TDS) concentration in the range of 200 to 250,000 ppmv, and a viscosity in the range of 1.00 to 2.00 centipoise (cP) at standard temperature and pressure; and wherein the aqueous displacement fluid has a dissolved zinc concentration in the range of 10 to 3,750 ppmv.

The unit "ppmv" is equivalent to the unit "mg/liter".

Preferably, the aqueous base fluid has a density in the range of 1.000 to 1.210 $g/cm^3$ at standard temperature and pressure. The densities of the aqueous base fluid and of the aqueous displacement fluid are discussed in more detail below.

The viscosity and density of the aqueous base fluid are defined at the "standard temperature and pressure" (STP) of the International Union of Pure and Applied Chemistry (IUPAC), that is, a temperature of 273.15K and an absolute pressure of 100 kPa. For avoidance of doubt, the viscosity of the aqueous base fluid is preferably determined in the absence of any dissolved gases.

Without wishing to be bound by any theory, it is believed that the dissolved zinc in the aqueous displacement fluid releases additional components of the crude oil that would not otherwise be released from the pores of the reservoir rock by waterflooding the reservoir with the aqueous base fluid in the absence of the dissolved zinc. Accordingly, a "bank of released oil" is swept through the reservoir towards the production well. The term "bank of released oil" is well known to the person skilled in the art and refers to a portion of the reservoir where the oil saturation is increased because of the application of an improved oil recovery method. Thus, an advantage of the method of the present invention is that incremental oil is recovered at the production well.

The incremental oil recovery that is achieved at any specified zinc concentration appears to increase with increasing salinity (TDS concentration) of the aqueous base fluid. It is therefore preferred that the aqueous base fluid used to form the aqueous displacement fluid has a TDS concentration of at least 1,000 ppmv, more preferably, at least 5,000 ppmv, yet more preferably, at least 10,000 ppmv, yet more preferably, at least 20,000 ppmv, in particular, at least 30,000, for example, at least 50,000 or at least 100,000 ppmv.

Preferably, the dissolved solids that are present in the aqueous base fluid include ions selected from Group IA metal cations (preferably, sodium or potassium cations, and mixtures thereof), Group IIA metal cations (preferably calcium or magnesium cations, and mixtures thereof), halide anions (preferably, fluoride, chloride, or bromide anions, and mixtures thereof), sulfate anions, nitrate anions, bicarbonate anions, carbonate anions, or organic acid anions. The dissolved solids that are present in the aqueous base fluid preferably comprise mixtures of one or more of these cations and one or more of these anions. Preferred organic acid anions that may be dissolved in the aqueous base fluid include $C_1$ to $C_6$ organic acid anions, for example, formate, acetate, propionate, oxalate, or malonate anions. Preferably, at least 90%, more preferably at least 95%, in particular, at least 98% of the dissolved ions in the aqueous base fluid are selected from Group IA metal cations, Group IIA metal cations and halide anions (based on Ionic Strength). Preferably, at least 70% preferably, at least 75% of the dissolved ions in the aqueous base fluid are selected from sodium cations, potassium cations, chloride anions and bromide anions (based on Ionic Strength). Preferably, at least 50%, more preferably, at least 60%, for example, at least 65% of the dissolved ions in the aqueous base fluid are sodium cations and chloride anions (based on Ionic Strength). Ionic Strength, I, is defined herein as:

$$I = \frac{1}{2}\sum_{i=1}^{n} c_i z_i^2$$

wherein $c_i$ is the molar concentration of ion i (mol·dm$^{-3}$), $z_i$ is the charge number of that ion, and the sum is taken over all ions in solution (based on the assumption that the dissolved solids are in the form of free ions).

Suitable waters that may be employed as the aqueous base fluid include seawater, estuarine water, brackish waters, produced waters (water separated from the fluids that are produced from an oil-bearing reservoir at a production facility), desalinated waters (waters from which at least a portion of the dissolved solids have been removed), aquifer waters, and fresh waters such as lake waters and river waters. If desired, mixtures of waters may be used as the aqueous base fluid. Preferably, the aqueous base fluid is seawater, a produced water or mixtures thereof. Typically, these waters contain only trace amounts of zinc, preferably, concentrations of zinc of less than 10 ppmv, for example, less than 5 ppmv. If desired, the aqueous base fluid may comprise a water-miscible co-solvent, for example, a $C_1$ to $C_4$ alcohol, preferably, methanol or ethanol, a ketone, for example, acetone, or a glycol, for example, ethylene glycol. Preferably, the co-solvent is present in the aqueous base fluid in an amount of less than 5% by volume, in particular, less than 1% by volume. For avoidance of doubt, the parts per million concentrations referred to herein are based on the total volume of solvent, i.e. water and any optional co-solvent used to form the aqueous base fluid.

Where injection of sulfates anions is to be avoided (owing to the risk of mineral scale formation or souring of the reservoir), the aqueous base fluid preferably comprises a sulfate reduced water. A sulfate reduced aqueous base fluid may be produced by contacting a feed water having a high sulfate concentration, for example, seawater, estuarine water, brackish water, produced water, or aquifer water, with a nanofiltration membrane that selectively excludes sulfate anions whilst allowing monovalent ions such as sodium and chloride ions to pass therethrough thereby producing a permeate having a lower concentration of sulfate anions and a retentate having a higher concentration of sulfate anions than the feed water.

The aqueous displacement fluid comprises a solution of a zinc salt in the aqueous base fluid, this solution being formed by dosing a zinc salt into the aqueous base fluid. Typically, the zinc salt is dosed into the aqueous base fluid in an amount that gives a dissolved zinc concentration in the resulting aqueous displacement fluid in the range of 10 to 3,750 ppmv.

Suitably, the aqueous displacement fluid, prior to injection into the reservoir, has a dissolved zinc concentration of up to 3,750 ppmv, preferably up to 3,000 ppmv, more preferably up to 2,500 ppmv, yet more preferably, up to 2,000 ppmv, still more preferably up to 1,250 ppmv, in particular, up to 1,000 ppmv, for example, up to 750 ppmv. Suitably, the dissolved zinc concentration of the aqueous displacement fluid, prior to injection into the reservoir, is at least 10 ppmv, preferably, at least 40 ppmv, yet more preferably, at least 75 ppmv, in particular, at least 100 ppmv. Preferably, the dissolved zinc concentration of the aqueous displacement fluid, prior to injection into the reservoir, is in the range of 40 to 1,250 ppmv, more preferably, in the range of 125 to 1,000 ppmv, for example, in the range of 150 to 500 ppmv.

The lower limit for the dissolved zinc concentration is the minimum concentration of zinc that is required to release and displace incremental oil from the reservoir rock when a zinc salt is dosed into the aqueous base fluid and may be determined, for example, from laboratory coreflood studies.

It has been found that the incremental oil recovery that is achieved using the method of the present invention increases with increasing ratio of the Ionic Strength of the aqueous displacement fluid to the molar concentration of dissolved zinc in the aqueous displacement fluid. Preferably, the ratio of the Ionic Strength to the molar concentration of dissolved zinc in the aqueous displacement fluid is at least 5:1, more preferably, at least 10:1, yet more preferably at least 100:1, for example, at least 1,000:1 (based on the assumption that the dissolved solids, including the dissolved zinc, are in the form of free ions).

It has also been found that the incremental oil recovery that is achieved using the method of the present invention increases with increasing molar ratio of dissolved chloride to dissolved zinc in the aqueous displacement fluid. Preferably, the molar ratio of dissolved chloride to dissolved zinc in the aqueous displacement fluid is at least 5:1, more preferably at least 10:1, yet more preferably, at least 100:1, for example, at least 1,000:1.

Preferably, the zinc salt that is dosed into the aqueous base fluid to form the aqueous displacement fluid may be a zinc halide (preferably zinc chloride, zinc bromide or zinc iodide), a water-soluble non-chelated zinc carboxylate (preferably zinc acetate or zinc lactate), zinc sulfate, zinc nitrite, zinc nitrate, zinc hydroxide or basic zinc carbonate. Zinc hydroxide and basic zinc carbonate may be rendered soluble in the aqueous base fluid by the addition of an acid. Where injection of sulfate anions is to be avoided (owing to the risk of mineral scale formation or souring of the reservoir), it is preferred not to dose zinc sulfate into the aqueous base fluid.

Without wishing to be bound by any theory, it is preferred to omit chelants for zinc, such as ethylenediaminetetraacetic acid (EDTA), from the aqueous displacement fluid as it is believed that chelated zinc species are less effective in releasing incremental oil.

The person skilled in the art will understand that the form in which the dissolved zinc exists in aqueous solution either prior to injection into the reservoir or within the reservoir may be dependent on pH. Without wishing to be bound by any theory, it has been found that insoluble forms of zinc salts may precipitate from aqueous solutions at neutral or weakly alkaline pH. It is also believed that the pH at which such insoluble zinc salts precipitate from solution may vary depending on the composition of the aqueous base fluid that is used to prepare the aqueous displacement fluid. The pH at which insoluble zinc salts precipitate from the aqueous displacement fluid may be readily determined using routine experiments. If necessary, the pH of the aqueous displacement fluid is adjusted to a value at which soluble forms of zinc salts exist in the aqueous displacement fluid prior to injection of the aqueous displacement fluid into the injection well. Typically, the risk of precipitation of insoluble zinc salts is mitigated at acidic pH. Accordingly, an acid may be added to the aqueous base fluid either before or after the addition of the zinc salt. Alternatively, the acid and zinc salt may be added simultaneously to the aqueous base fluid. For ease of adjustment of the pH, it is preferred to add the acid to the aqueous base fluid before addition of the zinc salt. Typically, the concentration of acid in the aqueous displacement fluid is less than 0.5% by weight, preferably, less than 0.25% by weight, more preferably, less than 0.1% by weight, for example, less than 0.05% or less than 0.025% by weight. The use of excess acid should be avoided owing to the risk of corrosion of pipework and downhole equipment and of dissolving acid soluble material present in the reservoir such as carbonate cements. It is therefore preferred that the pH of the aqueous displacement fluid is maintained above a value of 3 and below a value of 7, for example, above a value of 4 and below a value of 6.5.

Preferably, the acid is a protic acid. Suitable protic acids include hydrochloric acid, hydrobromic acid, hydrofluoric acid, nitric acid, sulfuric acid, sulfamic acid, and organic acids such as formic acid, acetic acid, and propanoic acid. Mixtures of acids could be used to adjust the pH of the aqueous base fluid. Preferably the acids are used in the form of aqueous solutions. Hydrochloric acid is preferred for adjusting the pH of the aqueous base fluid as this is readily available as a concentrated aqueous solution, for example, a 5% by weight aqueous solution. Where it is desirable to inject an aqueous displacement fluid having a low concentration of sulfate anions, it is preferred to avoid using sulfuric acid to adjust the pH of the aqueous base fluid.

The reservoir rock, through which the aqueous displacement fluid passes, is preferably a sandstone rock with which oil and water is associated, whether by inclusion in pores or between grains or otherwise. The person skilled in the art will understand that the injected aqueous displacement fluid will eventually buffer to the pH of the water associated with the reservoir rock (connate water, any aquifer water and any previously injected water). Typically, the pH of the water associated with the reservoir rock of a sandstone reservoir is in the range of 4 to 8.

The sandstone rock of the reservoir may comprise minerals, other than quartz, in an amount of up to 50% by weight, for example, 1 to 30% by weight. The mineral may be a clay, in particular, clay of the smectite type (such as montmorillonite), pyrophyllite type, kaolinite type, illite type, glauconite type, and chlorite type. Preferably, the clay is non-swelling under the conditions of recovery of crude oil from the formation. Examples of other minerals that may be present in a sandstone rock include transition metal compounds, such as oxides and carbonates, for example, iron oxide, siderite, and plagioclase feldspars. The average amount of minerals in the sandstone rock may be determined by X-ray diffraction using ground-up formation rock.

Where the sandstone rock of the oil-bearing reservoir contains swelling clays, in particular, smectite clays, a relatively high TDS for the aqueous displacement fluid may be required in order to stabilize the clays, thereby mitigating the risk of formation damage. Thus, where the sandstone rock contains an amount of swelling clays sufficient to result in formation damage (for example, an amount of swelling clays of greater than 12% by weight), the aqueous base fluid used to prepare the aqueous displacement fluid preferably has a total dissolved solids concentration (TDS) of greater than 8,000 ppmv. Where the sandstone rock comprises amounts of swelling clays that do not result in significant formation damage (for example, an amount of swelling clays of less than 12% by weight, for example, less than 10% by weight), the aqueous base fluid used to prepare the aqueous displacement fluid may have a TDS as low as 200 ppmv.

It has been found that the aqueous displacement fluid employed in the method of the present invention may increase the permeability of the reservoir rock to water or reduce permeability decline compared with a waterflood using the aqueous base fluid in the absence of an added zinc salt. Typically, the permeability of the reservoir to water, following a waterflood with an aqueous displacement fluid having a TDS of at least 5,000 ppmv, is increased by at least 4%, preferably, at least 7%, in particular, at least 10%, when compared with a waterflood using the aqueous base fluid in the absence of added zinc salt. Where the aqueous displacement fluid has a TDS of less than 5,000 ppmv, for example, less than 3,000 ppmv, the aqueous displacement fluid may either increase the permeability of the reservoir rock to water or reduce its permeability decline depending on the amount of swelling clays in the sandstone rock of the reservoir. Where the aqueous displacement fluid has a TDS of less than 5,000 ppmv, for example, less than 3,000 ppmv, it is preferred that the sandstone rock of the reservoir comprises an amount of swelling clays of less than 12% by weight, for example, less than 10% by weight.

Percentage incremental oil production is defined herein as:

$$[(S_{or}-S_{or}^1)/(S_{oi}-S_{or})]\times 100$$

wherein $S_{or}$ is the residual oil saturation achieved with the aqueous base fluid, $S_{or}^1$ is the residual oil saturation achieved with the aqueous displacement fluid, and $S_{oi}$ is the initial oil saturation.

Typically, the incremental oil production that can be achieved using the method of the present invention is at least 1%, preferably at least 3%, more preferably, at least 5%, in particular, at least 7.5%, for example, at least 10% above that achieved or predicted to be achieved when waterflooding the reservoir with an aqueous base fluid in the absence of the added zinc salt.

The reservoir comprises at least one oil-bearing layer of reservoir rock and preferably has at least one injection well and at least one production well penetrating the oil-bearing layer. Typically, the injection well and production well are vertical wells. A vertical well is defined herein as a well having a deviation from the vertical of less than 65 degrees) (°, preferably less than 45°, for example, less than 25°.

In a preferred embodiment, the injection well and production well may be extended reach wells or horizontal wells with the proviso that these wells are not side track wells from a common vertical wellbore. Thus, the production well does not overlie the injection well and the aqueous displacement fluid does not displace the oil upwardly in the oil-bearing layer of reservoir rock towards the production well. An extended reach well is defined herein as a well having a deviation from the vertical of between 65° to 80°. A horizontal well is defined herein as a well having a deviation from the vertical of greater than 80°.

The superficial velocity of the aqueous displacement fluid in the oil-bearing layer of the reservoir rock is typically in the range of 0.015 to 10 feet/day (0.0045 to 3 meters/day) and more often is in the range of 1 to 4 feet per day (0.3 to 1.2 meters/day) at a radial distance of greater than 20 feet from the injection well. The interwell spacing, L, between the injection well and the production well may typically be 1000 to 8000 feet (304.8 to 2438.4 meters). It may therefore take months or years for the bank of released oil and for the aqueous displacement fluid to break-through into the production well. Thus, there is a delay between commencement of injection of the aqueous displacement fluid into the reservoir and recovery of the incremental oil at the production well.

The aqueous displacement fluid may be injected into the reservoir either continuously or in the form of a slug of controlled pore volume (PV). The slug of controlled pore volume may be either of "very low" or "low" pore volume.

By "very low pore volume slug" is meant an injected amount of aqueous displacement fluid having a pore volume of less than 0.35, preferably, less than 0.3, for example, a pore volume in the range of 0.05 to 0.3, in particular, 0.1 to 0.25.

By "low pore volume slug" is meant an injected amount of aqueous displacement fluid having a pore volume in the range of 0.35 to less than 1, preferably 0.4 to 0.9 PV, yet more preferably, 0.4 to 0.8 PV, in particular, 0.4 to 0.7 PV, for example 0.4 to 0.6 PV.

Without wishing to be bound by any theory, it is believed that a "very low pore volume slug" of the aqueous displacement fluid may become diluted in the reservoir through mixing with the water associated with the reservoir rock (one or more of connate water, any aquifer water, and any previously injected water) and with a subsequently injected aqueous drive fluid.

The initial concentration of dissolved zinc in the "very low pore volume slug" of aqueous displacement fluid may be selected such that the diluted slug has a dissolved zinc concentration of at least 10 ppmv, preferably, at least 40 ppmv, more preferably, at least 75 ppmv, in particular, at least 100 ppmv. Modeling studies may be used to determine the optimal initial concentration of dissolved zinc for different sizes of very low pore volume slugs. If desired, a very low pore volume slug of a concentrated aqueous solution of a zinc salt in an aqueous base fluid may be injected into the reservoir from the injection well followed by an aqueous drive fluid that does not contain any added zinc salt or an insubstantial amount of added zinc salt (for example, the aqueous drive fluid has a dissolved zinc concentration of less than 10 ppmv or less than 5 ppmv) thereby generating, within the reservoir, an aqueous displacement fluid having the desired dissolved zinc concentration in the range of 10 to 3,750 ppmv by dilution of the concentrated solution through mixing with the water associated with the reservoir rock and with the aqueous drive fluid. The concentration of dissolved zinc in the concentrated solution of the zinc salt is typically greater than 3,750 ppmv, preferably greater than 4,000 ppmv, in particular, greater than 5,000 ppmv, for example, greater than 7,500 ppmv. The concentration of dissolved zinc in the concentrated aqueous solution of the zinc salt is preferably less than 25,000 ppm, more preferably, less than 15,000 ppmv, in particular, less than 10,000 ppmv.

Without wishing to be bound by any theory, it is believed that "a low pore volume slug" of aqueous displacement fluid does not mix significantly with the water associated with the reservoir rock (connate water, any aquifer water, and any previously injected water) or with any subsequently injected aqueous drive fluid such that a discrete slug of substantially undiluted aqueous displacement fluid moves through the reservoir until the aqueous displacement fluid breaks through into the production well.

Without wishing to be bound by any theory, it is believed that there may be loss of zinc to the reservoir. Where the aqueous displacement fluid is injected either continuously into the reservoir or in the form of a low pore volume slug followed by an aqueous drive fluid, the lower limit for the zinc concentration is preferably selected such that incremental oil is released and displaced from a substantial portion of the swept region of reservoir, for example, from at least 25%, preferably, at least 50%, for example, at least 75% of the swept region of the reservoir. Depending on the interwell distance, the lower limit for the zinc concentration may be selected such that the aqueous displacement fluid is effective in achieving incremental oil recovery from the entire swept region of the reservoir.

If there is a relatively small interwell spacing of less than 300 meters (as may occur on land), it may be preferred to inject a high pore volume of the aqueous displacement fluid or to even inject the aqueous displacement fluid continuously into the injection well over the lifetime of the reservoir. By "high pore volume" of aqueous displacement fluid is meant an amount of 1 to 20 PV, preferably, 1.1 to 10.0 PV, more preferably 1.2 to 5.0 PV, for example, 1.5 to 2.0 PV.

Where there is a relatively large interwell spacing of greater than 1 km, for example, greater than 2 km (as may occur in an offshore reservoir), injection of a low pore volume slug or a very low pore volume slug of the aqueous displacement fluid may be preferred.

Where a "high pore volume" of the aqueous displacement fluid is injected into the reservoir, it is envisaged that the concentration of dissolved zinc in the aqueous displacement fluid, within the reservoir, may initially decline owing to loss of zinc to the reservoir before reaching a relatively constant value. Thus, the concentration of dissolved zinc in the aqueous displacement fluid, within the reservoir, may be dependent upon a plurality of parameters including the initial dissolved zinc concentration, the rate of loss of zinc to the reservoir, the rate of gain of zinc from the reservoir, reservoir temperature and the rate at which the aqueous displacement fluid propagates through the reservoir.

Where a "low pore volume slug" or "very low pore volume slug" of the aqueous displacement fluid is injected into the reservoir, incremental oil will be recovered from the production well of the reservoir provided that the zinc concentration in the propagating slug of aqueous displacement fluid is maintained at or above the lower limit for the zinc concentration for a sufficient period of time for the slug to move away from the near wellbore region of the injection well and deeper into the reservoir.

It is preferred that dissolved zinc remains detectable in the propagating slug of aqueous displacement fluid at a location within the reservoir that is at least 30%, preferably, at least 50%, more preferably, at least 75%, in particular, at 100% of the interwell distance, L, between the injection well and production well. The presence of dissolved zinc in the slug of the aqueous displacement fluid can be determined by analyzing water produced from an observation well (also referred to as a "surveillance" well) located at a selected interwell distance between the injection well and production well or from modeling studies. In the event that dissolved zinc remains detectable in the propagating slug at 100% of the interwell distance, the presence of dissolved zinc may be determined by analyzing water produced from the production well.

For low pore volume slugs of the aqueous displacement fluid, it is preferred that the amount of zinc salt dosed into the aqueous base fluid to form the slug is increased either incrementally or continuously. Accordingly, any zinc that is lost to the reservoir at the front of the slug of the aqueous displacement fluid is replenished owing to diffusion of zinc along a diffusion gradient within the slug. Without wishing to be bound by any theory, this ensures that the concentration of dissolved zinc at the front of the slug remains above the lower limit for the dissolved zinc concentration (preferably, at least until the front of the slug has reached 30% of the interwell distance) resulting in a sharp edge to the front of the slug. Thus, prior to injection of the slug into the reservoir, the dissolved zinc concentration in the initial portion of the slug may be at a value at or close to the lower limit for the dissolved zinc concentration with the concentration of dissolved zinc increasing on moving from the front to the tail of the slug to a value at or close to the upper limit for the zinc concentration. Alternatively, the amount of zinc salt dosed into the aqueous base fluid to form the slug may be decreased either incrementally or continuously. Thus, prior to injection of the slug into the reservoir, the dissolved zinc concentration in the initial portion of the fluid may be at a value at or close to the upper limit for the dissolved zinc concentration with the concentration of dissolved zinc decreasing on moving from the front to the tail of the slug to value that is at or close to the lower limit for the dissolved zinc concentration. Without wishing to be bound by any theory, the high dissolved zinc concentration in the initial portion of the slug ensures that the front of the slug remains above the lower limit for the dissolved zinc concentration despite any loss of zinc to the reservoir concentration (preferably, at least until the front of the slug has reached 30% of the interwell distance). Again, this is advantageous as this results in a sharp front to the slug of aqueous displacement fluid. By "close to the lower limit" for the zinc concentration is meant within 1,000 ppmv, preferably within 500 ppmv, more preferably, within 250 ppmv, in particular, within 100 ppmv of the lower limit. By "close to the upper limit for the zinc concentration is meant within 2,750 ppmv, preferably, within 2,000 ppmv, in particular, within 1,000 ppmv, of the upper limit.

The increase or decrease in the dissolved zinc concentration may be accomplished in a variety of ways such as incrementally in two or more steps for example, two to four steps. Alternatively, the concentration of the dissolved zinc in the low pore volume slug may be increased or decreased continuously, for example, in a linear manner.

Where the dissolved zinc concentration of the low pore volume slug is increased or decreased incrementally, the slug will comprise a plurality of portions, for example, two to four portions, of successively higher or lower dissolved zinc concentrations respectively. These portions of the low pore volume slug typically each have a pore volume in the range of 0.05 to 0.3, preferably, 0.1 to 0.2. It is to be understood that these portions of the low pore volume slug may be equal or different in size. The person skilled in the art will understand that the concentration of dissolved zinc in the portions of the low pore volume slug, the sizes of the portions of the low pore volume slug, and the number of portions of the low pore volume slug can each be varied independently.

The term "pore volume" is used herein to mean the "swept pore volume" between an injection well and a production well. The "swept pore volume" is the pore volume swept by a displacement fluid averaged over all flow paths between an injection well and production well. Where a displacement fluid is injected into the reservoir via an injection well that has two or more associated production wells, the term "pore volume" means the swept pore volume between the injection well and the two or more production wells. The swept pore volume between an injection well and the associated production well(s) may be readily determined by methods known to the person skilled in the art. Thus, the swept pore volume may be determined by passing a high salinity water having an inert tracer contained therein through the formation from the injection well to the production well(s). The swept pore volume may also be determined using modeling studies. These modeling studies employ a reservoir simulator into which has been imported a static geological model of the reservoir. This static geological model is obtained by inputting seismic imaging data and petrophysical data (such as the porosity and permeability of the reservoir rock, mineralogical data, the initial water saturation of the reservoir, and the initial oil saturation of the reservoir) thereby generating a 3 dimensional (3-D) model of the reservoir showing the layers of the reservoir rock, traps and any faults and incorporating petrophysical data associated with one or more layers of the reservoir. The locations of the injection well(s) and production well(s) are subsequently inputted into the reservoir simulator together with additional fluid properties such as the relative permeabilities of the reservoir rock to oil and water. The reservoir simulator is then used to model injection of fluids into the reservoir via the injection well(s), movement of fluids through one or more layers of the reservoir, in particular, the oil-bearing layers, and production of fluids from the reservoir via the production well(s). The reservoir simulator model may also be updated using 4-dimensional (4-D) seismic imaging data i.e. seismic imaging data obtained at one or more points in time following commencement of oil production from the reservoir. The reservoir simulator may be used to determine the swept pore volume between an injection well and one or more production wells by modeling the movement of an injected fluid comprising a tracer from the injection well to the production well(s). The swept pore volume differs from a pore volume determined using the volume of the oil-bearing layer(s) between the injection well and production well(s) and the porosity of the reservoir rock as the swept pore volume takes into account barriers to flow such as a reduction in permeability of the reservoir rock.

As discussed above, the zinc salt is dosed into the aqueous base fluid to form the aqueous displacement fluid. The zinc salt may be dosed into the aqueous base fluid in the form of a powder, for example, using a metered hopper system. Preferably, the powder is stored under a blanket of a dry inert gas such as nitrogen, in order to mitigate risks associated with powder handling or with hydration of the powder. Typically, the powder comprises particles of a zinc salt having an average particle diameter in the range of 100 μm to 5 mm.

Alternatively, a concentrated solution of the zinc salt (hereinafter referred to as "concentrate") may be dosed into the aqueous base fluid, for example, using a metered pump system. Suitably, the concentrate has a concentration of zinc salt of at least 10,000 ppmv, preferably, at least 15,000 ppmv, for example, a concentration in the range 20 to 75% by weight, preferably, 30 to 70% by weight, for example, 40 to 70% by weight. The upper limit for the concentration of zinc salt in the concentrate is the saturation concentration at the storage conditions for the concentrate. Suitably, the concentrate is stored in a vessel at the injection site. Depending on the concentration of the zinc salt, the concentrate may be corrosive. Accordingly, it may be desirable to form the vessel from corrosion resistant steel such as a steel alloy having a minimum 10.5% by weight chromium content. Alternatively the internal surface of the vessel may be provided with a liner or a coating formed from a corrosion resistant material, for example, a metal such as a titanium or a polymeric material. The concentrate may be prepared using fresh water as solvent with the proviso that the aqueous displacement fluid that is formed upon dosing the concentrate into the aqueous base fluid has a concentration of dissolved solids, excluding zinc, of at least 200 ppmv. The concentrate may also be prepared using a higher salinity water as solvent, for example, a water having a TDS concentration in the range of 1,000 to 50,000 ppmv. Preferably, the pH of the concentrate is acidic in order to mitigate the risk of precipitation of insoluble zinc salts during storage of the concentrate. Where the zinc salt is zinc hydroxide or basic zinc carbonate, it is essential that an acid is added to the water in order to acidify the water and dissolve the zinc salt thereby forming the concentrate.

Where the sandstone rock of the oil-bearing reservoir contains swelling clays in an amount sufficient to result in formation damage and the zinc salt is dosed into the aqueous base fluid in the form of a concentrate, the resulting aqueous displacement fluid preferably has a dissolved solids concentration, excluding zinc, of greater than 8,000 ppmv.

Suitably, the amount of the powder or of the concentrate that is dosed into the aqueous base fluid may be controlled, for example, to maintain the concentration of zinc in the aqueous displacement fluid at or near a target concentration, for example, within ±10% of a target concentration. Alternatively, the amount of powder or of concentrate that is dosed into the aqueous base fluid may be increased or decreased either incrementally or continuously following a predetermined concentration profile. The dosing of the powder or concentrate into the aqueous base fluid is preferably automated, for example, using a metering system that is controlled via a computer. Preferably, the powder or concentrate is dosed into an injection header at an injection site.

It is envisaged that where a powder is dosed into the aqueous base fluid, the particles of zinc salt will be substantially dissolved in the aqueous base fluid before the aqueous displacement fluid is injected into the reservoir.

After injection of the aqueous displacement fluid into the reservoir, an aqueous drive fluid may be injected to sweep the aqueous displacement fluid (and hence the bank of released oil) through the reservoir to the production well or to maintain the pressure in the reservoir. Typically, this aqueous drive fluid does not contain any added zinc salt or insubstantial amounts of added zinc salt. Preferably, the aqueous drive fluid has a dissolved zinc concentration of less than 10 ppmv, in particular, less than 5 ppmv. Suitably, this aqueous drive fluid may be seawater, estuarine water, brackish water, produced water, aquifer water, fresh water (for example, river water or lake water), or a desalinated water. Where injection of sulfate anions is to be avoided, the aqueous drive fluid may be a sulfate reduced water, for example, a sulfate reduced seawater. Preferably the aqueous drive fluid is the aqueous base fluid that is used to prepare the aqueous displacement fluid.

Where the aqueous base fluid has a TDS of at least 20,000 ppmv, preferably, at least 30,000 ppmv, in particular, at least 50,000 ppmv, for example, at least 100,000 ppmv, it is preferred that the aqueous drive fluid has a density that is less than 0.100 $g/cm^3$ higher, preferably, less than 0.050 $g/cm^3$ higher, more preferably, less than 0.010 $g/cm^3$ higher than the aqueous base fluid. For avoidance of doubt, it is envisaged that the aqueous drive fluid may also have the same density as the aqueous base fluid or a lower density than the aqueous base fluid, for example, a density, up to 0.250 $g/cm^3$ lower than that of the aqueous displacement fluid.

The aqueous displacement fluid employed in the method of the present invention may optionally contain one or more conventional additives used in enhanced oil recovery, as these additives may further improve oil recovery from the reservoir. However, for avoidance of doubt, incremental oil recovery is achieved with the method of the present invention in the substantial absence of such conventional additives, for example, when the aqueous displacement fluid contains less than 1% by weight, in particular, less than 0.5% by weight of such conventional additives.

Suitably, the optional conventional additive may be a viscosifying additive, for example, a water-soluble viscosifying polymer (such as a polyacrylamide or polysaccharide) or a viscoelastic surfactant. The optional additive may also be a conventional surfactant that acts as a wetting agent, dispersant or emulsifier.

Where the aqueous displacement fluid contains a viscosifying polymer, it is preferred that the polymer does not have any anionic functional groups or any chelating functional groups as these may remove dissolved zinc from the aqueous displacement fluid. Where the aqueous displacement fluid contains a surfactant (either a viscoelastic surfactant or conventional surfactant), it is preferred that the surfactant is either a non-ionic surfactant or is a surfactant having a cationic head group. Thus, the skilled person would understand that surfactants having anionic head groups should be avoided owing to the risk of precipitation of zinc soaps.

In the absence of a viscosifying additive, the viscosity of the aqueous displacement fluid is close to that of the aqueous base fluid. Typically, a non-viscosified aqueous displacement fluid has a viscosity in the range of 1.00 to 2.00 centipoise (cP), preferably, 1.00 to 1.50 cP, in particular, 1.00 to 1.25 cP, for example, in the range of 1.00 to 1.15 cP, when measured at standard temperature and pressure (STP). However, in the event that the aqueous displacement fluid is employed in a Water Including Gas (WIG) flood in which a gas such as carbon dioxide or methane is added to the aqueous displacement fluid, its viscosity may be reduced to a value of less than 1.00 cP. Thus, for avoidance of doubt, the viscosity of the aqueous displacement fluid is measured at STP in the absence of any dissolved gases. Where the aqueous displacement fluid is employed in a WIG flood, the incremental oil production that is achieved or predicted to be achieved using the method of the present invention is relative to a WIG flood in which a gas is added to the aqueous base fluid in the absence of added zinc salt.

In the absence of a viscosifying additive, the viscosity of the aqueous displacement fluid at reservoir conditions is typically in the range of 0.30 to 2.00 centipoise (cP), preferably, 0.30 to 1.50 cP, for example, 0.30 to 1.00 cP. The viscosity of the aqueous displacement fluid at reservoir conditions may be lower than 1.00 cP owing to gases (for example, hydrocarbon gases and/or carbon dioxide) dissolving in the injected fluids. In addition, the viscosity of the aqueous displacement fluid may be lower than 1.00 cP at reservoir conditions owing to the relatively high temperature of the reservoir.

A viscosifying additive may be optionally added to the aqueous displacement fluid such that its viscosity more closely matches that of the oil contained within the reservoir rock. Typically, the resulting viscosified aqueous displacement fluid has a viscosity at reservoir conditions in the range of 1 to 40 cP, preferably 2 to 30 cP, in particular, 3 to 30 cP. Typically, the resulting viscosified aqueous displacement fluid has a viscosity at standard temperature and pressure (determined in the absence of dissolved gases) of greater than 2 cP, preferably, greater than 3 cP, for example, in the range of 3 to 40 cP.

It is envisaged that any subsequently injected aqueous drive fluid may optionally contain a conventional surfactant or a viscosifying additive such as a viscosifying polymer or a viscoelastic surfactant.

Typically, the aqueous base fluid has a low density of less than 1.210 g/cm$^3$, preferably, less than 1.200 g/cm$^3$, more preferably, less than 1.150 g/cm$^3$, most preferably less than 1.100 g/cm$^3$, in particular, less than 1.050 g/cm$^3$, for example, less than 1.030 g/cm$^3$ at standard temperature and pressure. Typically, the base fluid has a density of at least 1.000 g/cm$^3$, preferably 1.005 g/cm$^3$, more preferably, of at least 1.010 g/cm$^3$, at standard temperature and pressure. Preferably the aqueous base fluid has a density in the range of 1.005 to 1.200 g/cm$^3$, for example, 1.005 to 1.150 g/cm$^3$ or 1.005 to 1.100 g/cm$^3$ at standard temperature and pressure. Typically, the density of the aqueous displacement fluid (containing the added zinc salt) is less than 0.010 g/cm$^3$ higher than the density of the aqueous base fluid. Typically, the density of a viscosified aqueous displacement fluid (containing the added zinc salt and a viscosifying additive) is less than 0.050 g/cm$^3$ higher than the density of the aqueous base fluid.

In the method of the invention, the aqueous displacement fluid is preferably injected, under pressure, into at least one injection well that is spaced from a production well such that the aqueous displacement fluid passes into at least one oil-bearing layer of the reservoir. The passage of the aqueous displacement fluid through the oil-bearing layer of the reservoir displaces oil from the reservoir rock and forces the displaced oil ahead of it, and towards the production well from which the oil is recovered. Preferably, the injection well and production well are spaced part in a lateral direction i.e. are not overlying.

However, the aqueous displacement fluid may also be used in a process where a well penetrates at least one oil-bearing layer of a reservoir and this well serves as both the injection well and production well, that is, the aqueous displacement fluid is injected into the well and then the well is subsequently put onto production (known in the industry as a "huff and puff" process).

Depending on the reservoir pressure, the injection pressure of the aqueous displacement fluid may be in the range of 10,000 to 100,000 kPa absolute (100 to 1,000 bar absolute). It is preferred that the aqueous displacement fluid is injected into the reservoir at a pressure that is above the reservoir pressure and below the fracture pressure of the reservoir rock. Suitably the injection pressure is at least 1000 kPa below the fracture induction pressure.

The method of the present invention may be used in secondary recovery mode which may occur at commencement of oil production from the reservoir (omitting primary recovery) or after primary recovery of oil under the natural pressure of the reservoir. Alternatively, the method of the present invention may be used in tertiary recovery mode (for example, after a waterflood with a high salinity water or a low salinity water).

The person skilled in the art will understand that in secondary recovery mode, a fluid is injected into the formation from an injection well in order to maintain the pressure in the formation and to sweep oil towards a production well. An advantage of injecting the aqueous displacement fluid (containing a dissolved zinc salt) into the reservoir during secondary recovery is that the aqueous displacement fluid has been formulated so as to release additional oil from the pores of the reservoir rock. Accordingly, there may be a longer period of dry oil recovery from the production well thereby deferring water break-through. In addition, even after water break-through, there will be enhanced recovery of oil compared with using the aqueous base fluid as the injection water, and potentially less water production. Also, there may be less water production (a higher oil to water ratio) for a given volume of produced fluid compared with using the aqueous base fluid as the injection water. These advantages also apply if the method of the present invention is used at commencement of oil production from a reservoir.

The person skilled in the art will understand that in tertiary recovery, injection of the original fluid is stopped and a different fluid is injected into the reservoir for enhanced oil recovery. Thus, the fluid that is injected into the reservoir during tertiary recovery is the aqueous displacement fluid (containing a dissolved zinc salt), and the fluid that has previously been injected into the formation during secondary recovery may be a water that does not contain a zinc salt or contains insubstantial amounts of zinc salts, for example, naturally occurring levels of dissolved zinc such as less than 10 ppmv, in particular, less than 5 ppmv. Typically, the previously injected water may be seawater, estuarine water, brackish water, produced water, aquifer water, river water, lake water, desalinated water or a mixture thereof.

There may be one injection well and one production well, but preferably there may be more than one injection well and more than one production well. There may be many different spatial relationships between the or each injection well and the or each production well. Injection wells may be located around a production well. Alternatively the injection wells may be in two or more rows between each of which are located production wells. These configurations are termed "pattern flood", and the person skilled in the art will know how to operate the injection wells to achieve maximum oil recovery during the waterflood treatment (secondary or tertiary recovery). Where the aqueous displacement fluid is injected into the reservoir via an injection well having two or more associated production wells, the pore volume of the aqueous displacement fluid will be the swept volume between the injection well and the two or more production wells. The person skilled in the art will understand that depending on the spatial arrangement of the injection well and its associated production wells, the aqueous displacement fluid may break-through into each production well at different times.

The aqueous displacement fluid having a zinc salt dissolved therein is particularly suitable for use in reservoirs where the oil associated with the reservoir rock has an American Petroleum Institute (API) gravity of at least 15°, preferably at least 20° more preferably, at least 30°, for example an API gravity in the range of 30 to 50. Typically, the oil that is associated with the reservoir rock has gas dissolved therein.

The present invention will now be illustrated by reference to the following Examples.

Coreflood Facilities

The following studies utilized a coreflood facility operated at non-reservoir conditions (referred to in the art as "reduced conditions") of temperatures up to 75° C., a pore pressure of 20 bar gauge (2 MPa gauge) and a confining pressure of 60 bar gauge (6 MPa gauge). The coreflood facility employed dead fluids (oil and brine having no dissolved gas at the conditions of the test).

Core Preparation

Core plug samples, nominally 3" long by 1.5" in diameter were used for the studies.

However, the person skilled in the art will understand that different sized core plug samples may also be used. The samples were first restored i.e. the samples were cleaned using miscible solvents (for example, methanol and toluene) such that they were as close to being in a "water wet" condition as possible. After cleaning, the samples were placed into hydrostatic coreholders and the samples were saturated with a high salinity brine by flowing the water through the core plugs under a back pressure. After a throughput of approximately 10 pore volumes of brine, the samples were removed from the hydrostatic coreholders and the initial water saturation was set up in each sample using the procedure described below. The composition of the high salinity brine is given in Table 1 below.

Acquisition of Initial Water Saturation ($S_{wi}$)

It was essential that each core plug sample had a representative initial water saturation ($S_{wi}$) value. The initial water saturation for each sample was achieved by a confined porous plate de-saturation technique, using the strongly non-wetting gas, nitrogen. This technique is well known to the person skilled in the art and will not be discussed further here. Once the initial water saturations were acquired, the samples were loaded into hydrostatic core holders and saturated with a refined oil under back pressure. A dispersion test (discussed below) was then performed to confirm the value of $S_{wi}$ acquired.

Ageing of Core Samples

The core plug samples were then loaded into coreholders and slowly raised in pressure and temperature to the test conditions.

The refined oil was then miscibly displaced at the test conditions by crude oil via a 0.5 PV slug of toluene. Thus, a slug of toluene is injected into the sample before injecting the crude oil. The toluene is miscible with both the refined oil and the crude oil and therefore allows the refined oil to be readily displaced by the crude oil. After the differential pressure across the core sample had stabilized, the crude oil viscosity and effective permeability of the core sample to the crude oil were measured using techniques well known to the person skilled in the art. The core sample was then aged in the crude oil for one week. During the ageing period the crude oil was replaced once immediately before commencing waterflooding of the core samples. A minimum of one Pore Volume of crude oil was injected and a sufficient amount of crude oil was used to achieve a constant pressure drop (differential pressure) across the sample.

Coreflood Test Method

All corefloods were performed under unsteady state conditions using procedures well known to the person skilled in the art.

A secondary waterflood was performed using a high salinity brine. This brine was injected into the core sample at a typical injection rate of nominally 4 ml/hour (which is a typical frontal advance rate for a waterflood in a reservoir). During injection of the brine, the differential pressure across the sample was recorded and the volume of oil produced from the sample was measured. Oil production was determined by collecting the effluent produced from the core sample using a volumetric sampler into which has been loaded a plurality of sample bottles. The mass of oil contained in each of the sample bottles and hence the total mass of oil produced from the core sample could then be determined. The total volume of produced oil could then be calculated from the density of the oil.

The waterflood with the high salinity brine was allowed to continue until the differential pressure, and oil production readings reached equilibrium. Equilibrium was taken to be reached when no oil was observed in the effluent that was removed from the core sample. Permeability of the core plug sample to water at residual (remaining) oil saturation was then measured using a technique well known to the person skilled in the art.

In coreflood tests that employed an aqueous displacement fluid comprising a zinc salt dissolved in a low salinity aqueous base fluid, a tertiary waterflood using a low salinity water was run at the same injection rate as for the secondary waterflood with the high salinity brine. This tertiary waterflood was continued until the differential pressure, and oil production readings reached equilibrium. Permeability of the core plug samples to water at residual (remaining) oil saturation was then measured. The tertiary waterflood using a low salinity water was then followed by a further tertiary waterflood using an aqueous displacement fluid prepared by adding a zinc salt to the low salinity water. The tertiary waterflood with this aqueous displacement fluid was also continued until the differential pressure, and oil production readings reached equilibrium.

In coreflood tests that employed a displacement fluid comprising a zinc salt dissolved in a high salinity base fluid, the low salinity base waterflood was omitted. A tertiary waterflood was run at the same injection rate as for the secondary waterflood with the high salinity brine using a test aqueous displacement fluid prepared by adding a zinc salt to the high salinity brine. The tertiary waterflood with the test aqueous displacement fluid was also continued until the differential pressure, and oil production readings reached equilibrium.

During the sequence of core floods, samples of oil and produced aqueous effluent were collected and the amount of oil produced under different waterflood conditions was determined.

At the end of the sequence of waterfloods, the final oil saturation of the core sample was determined by means of a dispersion test (as described below) thereby ensuring effective mass balancing during the waterflooding sequence.

Dispersion Tests

Dispersion tests were used at different stages of the preparation of the core samples and the coreflood studies. The objective of a dispersion test is to measure the volume of fluid within the core sample at different stages of the experiments. For example, a dispersion test carried out on a core sample that is at 100% water saturation will provide the pore volume and porosity of the core sample, a dispersion carried out on the core sample when at initial water saturation ($S_{wi}$) or at residual oil saturation ($S_{or}$) will provide a measure of these saturation values. Thus, the dispersion test results provide quality assurance for the volumetric data that are obtained during the coreflood studies.

In a dispersion test, an undoped fluid located in the pore space of the core sample may be miscibly displaced by doped fluid or a doped fluid located in the pore space of the core sample may be displaced by an undoped fluid. Thus, an undoped aqueous fluid may be miscibly displaced by an 'iodide' doped aqueous fluid (or vice versa) while an undoped oleic fluid may be miscibly displaced by an 'iodo-decane' doped oleic fluid (or vice versa). The doped oleic fluid may be a doped refined oil. The density of the miscibly displaced fluid (effluent) is determined over time by taking samples of the effluent. The densities of the samples of effluent are normalized to the density of the doped fluid ($\rho_{sample} = \rho_{effluent}/\rho_{duped\ fluid}$) and the normalized densities are plotted against the volume of effluent displaced from the core when each of the samples of effluent were taken. The volume of the mobile fluid (aqueous or oleic fluid) within the core sample is then calculated from the volume of the displaced fluid present in the effluent samples. Thus, the volume of mobile fluid may be deduced from the densities and volumes of each of the effluent samples. The volume of mobile fluid within the pore space of the core sample is also the volume of effluent that has been displaced from the core sample when the normalized density of the displaced fluid is 0.5.

When a dispersion test is performed for a core sample at 100% water saturation, aqueous fluids are used and the test gives a value for the total pore volume of the core sample.

When a dispersion test is performed with a core sample at initial water saturation, $S_{wi}$, part of the pore volume of the core sample is occupied by a mobile oil phase, with the remainder of the pore volume occupied by an immobile water phase. The dispersion test therefore uses an iododecane doped oil (oleic fluid) as the displacement fluid. Accordingly, the volume of aqueous fluid in the pore space of the core sample at $S_{wi}$ is:

Volume of Aqueous Fluid=Total Pore Volume−Volume of oil.

When a dispersion test is performed with a core sample at residual oil saturation, $S_{or}$, part of the pore volume of the core sample is occupied by a mobile aqueous phase with the remainder of the pore space occupied by an immobile oil phase. The dispersion test therefore uses an iodide doped aqueous fluid. Accordingly, the volume of oil in the pore space of the core sample at $S_{or}$ is:

Volume of Oil=Total Pore Volume−Volume of Aqueous Fluid.

Thus, provided the total pore volume of the core sample has been determined, the volume of oil remaining in the core sample can be determined.

As discussed above, during the sequence of core floods, samples of produced oil and produced aqueous effluent were collected and the volume of oil produced under different waterflood conditions was determined.

Percentage incremental oil production was then calculated from:

$$[(S_{or} - S_{or}^1)/(S_{oi} - S_{or})] \times 100.$$

$S_{oi}$ (the initial oil saturation) was calculated from:

$$S_{oi} = (\text{hydrocarbon pore volume})/\text{total pore volume}.$$

Hydrocarbon pore volume was determined from dispersion tests carried out with the core sample at initial water saturation, $S_{wi}$. Total pore volume was determined from dispersion tests with all of the pore volume of the core sample filled with water i.e. before acquiring $S_{wi}$.

Residual oil saturation. $S_{or}$, was then calculated from the volume of oil produced during the secondary waterflood:

$$S_{or} = S_{oi} - [\text{oil produced from secondary waterflood/total pore volume}].$$

$S_{or}^1$ was determined using the volume of oil produced during the tertiary waterflood:

$$S_{or}^1 = S_{or} - [\text{oil produced in the tertiary waterflood/total pore volume}].$$

The total amount of oil produced was compared with the final residual oil saturation of the cores, as determined from dispersion tests, to ensure effective mass balancing during the waterfloods.

TABLE 1

Brine compositions used in tests

| Salt | Fluid 1 (Synthetic Seawater) mg/L (ppmv) | Fluid 2 (Low Salinity Water) mg/L (ppmv) | Fluid 3 (Highly Saline Brine) mg/L (ppmv) |
|---|---|---|---|
| NaHCO$_3$ | 191.4 | 6.3 | 202.4 |
| CaCl$_2$•2H$_2$O | 1467.1 | 48.1 | 46463.0 |
| MgCl$_2$•6H$_2$O | 10639.8 | 349.0 | 25395.0 |
| KCl | 724.6 | 23.8 | 0.0 |
| NaCl | 23478.1 | 770.1 | 147111.5 |
| Total Dissolved solids | 30489 | 1000 | 194304 |

EXAMPLE 1

A coreflood test was carried out under reduced conditions (a temperature of 72° C. and a pressure of 20 bar gauge) with Reservoir Core 1 using the test method described above. Reservoir Core 1 was a sandstone rock having a quartz content of 78.5% by weight and a total clay content of 10.2% by weight as measured by X-ray diffraction. An aqueous displacement fluid formed by adding 100 ppmv of zinc chloride to Fluid 2 (the low salinity water of Table 1) was injected into the core following a secondary waterflood with Fluid 1 (the synthetic seawater of Table 1) and a tertiary waterflood with Fluid 2. The results are presented in Table 2 below. It can be seen that there was incremental oil recovery compared with the baseline secondary waterflood with Fluid 1 and with the tertiary waterflood with Fluid 2.

TABLE 2

| Fluids | Incremental oil produced (%) | Cl to Zn molar ratio | Ratio of Ionic Strength to molar Zn concentration | Permeability, K, (mD) | % increase in Permeability Over Secondary Waterflood* |
|---|---|---|---|---|---|
| Secondary waterflood with Fluid 1 | Not applicable | ∞ | ∞ | 2.61 | Not applicable |
| Tertiary waterflood with Fluid 2 | 4.2% | ∞ | ∞ | 2.70 | 3 |

TABLE 2-continued

| Fluids | Incremental oil produced (%) | Cl to Zn molar ratio | Ratio of Ionic Strength to molar Zn concentration | Permeability, K, (mD) | % increase in Permeability Over Secondary Waterflood* |
|---|---|---|---|---|---|
| Tertiary waterflood with Fluid 2 + 100 ppmv ZnCl$_2$ | 0.8% | 26.0:1 | 27.9:1 | 3.23 | 24 |

*[(Permeability after tertiary waterflood − permeability after secondary waterflood)/permeability after secondary waterflood] × 100

EXAMPLE 2

A reduced condition coreflood test was carried out at a temperature of 72° C. and a pressure of 20 bar gauge with Reservoir Core 2. Reservoir core 2 was a sandstone rock having a quartz content of 78.3% by weight and a total clay content of 9.6% by weight, as measured by X-ray diffraction. An aqueous displacement fluid formed by adding 200 ppmv of zinc chloride to Fluid 2 (low salinity water of Table 1) was injected into the core following a secondary waterflood with Fluid 1 and a tertiary waterflood with Fluid 2. The results are presented in Table 3 below. It can be seen that there was incremental oil recovery compared with the baseline secondary flood with Fluid 1 and the tertiary waterflood with Fluid 2.

TABLE 3

| Fluids | Incremental oil produced (%) | Cl to Zn molar ratio | Ratio of Ionic Strength to molar Zn concentration | Permeability, K, (mD) | % increase in Permeability Over Secondary Waterflood* |
|---|---|---|---|---|---|
| Secondary waterflood with Fluid 1 | Not applicable | ∞ | ∞ | 6.03 | Not applicable |
| Tertiary waterflood with Fluid 2 | 0.12% | ∞ | ∞ | 6.46 | 7 |
| Tertiary waterflood with Fluid 2 + 200 ppmv ZnCl$_2$ | 1.96% | 14.0:1 | 14.4:1 | 6.45 | 7 |

*[(Permeability after tertiary waterflood − permeability after secondary waterflood)/permeability after secondary waterflood] × 100

EXAMPLE 3

A reduced condition coreflood test was carried out at a temperature of 72° C. and a pressure of 20 bar gauge with Reservoir Core 3. Reservoir Core 3 was a sandstone rock having a quartz content of 81.6% by weight and a total clay content of 7.4% by weight, as measured by X-ray diffraction. A secondary waterflood using Fluid 1 (synthetic seawater of Table 1) was followed by a tertiary waterflood using Fluid 1 containing 1000 ppmv of zinc chloride. The results are shown in Table 4 below. It can be seen that there was incremental oil recovery compared with the baseline secondary waterflood with Fluid 1.

TABLE 4

| Fluids | Incremental oil produced (%) | Cl to Zn molar ratio | Ratio of Ionic Strength to molar Zn concentration | Permeability, K, (mD) | % increase in Permeability Over Secondary Waterflood* |
|---|---|---|---|---|---|
| Secondary waterflood with Fluid 1 | Not applicable | ∞ | ∞ | 7.09 | Not applicable |
| Tertiary waterflood with Fluid 1 + 1000 ppmv ZnCl$_2$ | 3.1% | 75.7:1 | 82.9:1 | 9.28 | 31 |

*[(Permeability after tertiary waterflood − permeability after secondary waterflood)/permeability after secondary waterflood] × 100

EXAMPLE 4

A coreflood test was carried out under reduced conditions at a temperature of 55° C. and a pressure of 20 bar gauge with Reservoir Core 4 using the test method described above. Reservoir Core 4 was a sandstone rock having a quartz content of 79.6% by weight and a total clay content of 10.8% by weight, as measured by X-ray diffraction. A secondary waterflood using Fluid 3 (highly saline brine of Table 1) was followed by a tertiary waterflood using an aqueous displacement fluid formed by adding 400 ppmv of zinc chloride to Fluid 3. The results are shown in Table 5 below. It can be seen that there was incremental oil recovery compared with the baseline secondary waterflood with Fluid 3.

TABLE 5

| Fluid | Incremental oil produced (%) | Cl to Zn molar ratio | Ratio of Ionic Strength to molar Zn concentration | Permeability, K, (mD) | % increase in Permeability Over Secondary Waterflood* |
|---|---|---|---|---|---|
| Secondary waterflood with Fluid 3 | Not applicable | ∞ | ∞ | 2.42 | Not applicable |
| Tertiary waterflood with Fluid 3 + 400 ppmv ZnCl$_2$ | 3.8% | 1160.4:1 | 1310.5:1 | 3.03 | 25 |

*[(Permeability after tertiary waterflood − permeability after secondary waterflood)/permeability after secondary waterflood] × 100

EXAMPLES 5 TO 7

Coreflood tests were carried out under reduced conditions at a pressure of 20 bar gauge and at increasing temperatures of 40, 55 and 72° C. for Reservoir Cores 5 to 7 respectively, using the test method described above. Reservoir Cores 5 to 7 were taken from the same sandstone reservoir and were matched as closely as possible in physical and chemical properties. The cores had quartz contents ranging from 78% to 90% by weight and total clay contents ranging from 5 to 9% by weight, as measured by X-ray diffraction. For each coreflood, a secondary waterflood using Fluid 1 (synthetic seawater of Table 1) was followed by a tertiary waterflood using Fluid 1 containing 1000 ppmv of zinc chloride. The results are shown in Tables 6 to 8 below. It can be seen that incremental oil was observed for each coreflood test.

TABLE 6

Coreflood test for Reservoir Core 5 (at a temperature of 40° C.)

| Fluids | Incremental oil produced (%) | Permeability, K, (mD) | % increase in Permeability Over Secondary Waterflood* |
|---|---|---|---|
| Secondary waterflood with Fluid 1 | Not applicable | 13.7 | Not applicable |
| Tertiary waterflood with Fluid 1 + 1000 ppmv ZnCl$_2$ | 2.1 | | 2.3 |

*[(Permeability after tertiary waterflood − permeability after secondary waterflood)/permeability after secondary waterflood × 100

TABLE 6

Coreflood test for Reservoir Core 6 (at a temperature of 55° C.)

| Fluids | Incremental oil produced (%) | Permeability, K, (mD) | % increase in Permeability Over Secondary Waterflood* |
|---|---|---|---|
| Secondary waterflood with Fluid 1 | Not applicable | 12.1 | Not applicable |
| Tertiary waterflood with Fluid 1 + 1000 ppmv ZnCl$_2$ | 2.1 | | 9.1 |

*[(Permeability after tertiary waterflood − permeability after secondary waterflood)/permeability after secondary waterflood × 100

TABLE 7

Coreflood test for Reservoir Core 7 (at a temperature of 72° C.)

| Fluids | Incremental oil produced (%) | Permeability, K, (mD) | % increase in Permeability Over Secondary Waterflood* |
|---|---|---|---|
| Secondary waterflood with Fluid 1 | Not applicable | 8.3 | Not applicable |
| Tertiary waterflood with Fluid 1 + 1000 ppmv ZnCl$_2$ | 2.3 | | 17.8 |

*[(Permeability after tertiary waterflood − permeability after secondary waterflood)/permeability after secondary waterflood × 100

The invention claimed is:

1. A method for recovering crude oil from a reservoir that is penetrated by at least one injection well, the method comprising:
    injecting an aqueous displacement fluid comprising a solution of a zinc salt in an aqueous base fluid into the reservoir from the injection well,
    wherein the aqueous base fluid comprises a sulfate reduced water produced by contacting a feed water with a nanofiltration membrane that selectively excludes sulfate anions whilst allowing monovalent ions such as sodium and chloride ions to pass therethrough thereby producing a permeate having a lower concentration of sulfate anions and a retentate having a higher concentration of sulfate anions n the feed water, wherein the aqueous base fluid has a total dissolved solids (TDS) concentration in the range of 200 to 250,000 ppmv (parts per million based on the volume of the aqueous base fluid), and a viscosity in the range of 1.00 to 2.00 centipoise (cP) at standard temperature and pressure; and wherein the aqueous displacement fluid has a dissolved zinc concentration in the range 100 to 3,750 ppmv, wherein the aqueous displacement fluid is formed by dosing a zinc salt into the aqueous base fluid at an injection site of the reservoir in the form of: (a) a dry powder or (b) a concentrate comprising an aqueous solution of the zinc salt having a concentration in the range of 20% to 75% by weight, wherein the concentration of dissolved solids in the aqueous displacement fluid, excluding dissolved zinc, is at least 200 ppmv, and wherein the zinc salt that is dosed into the aqueous base fluid is a zinc halide, a water-soluble non-chelated zinc carboxylate, zinc sulfate, zinc nitrite, zinc nitrate, zinc hydroxide or basic zinc carbonate.

2. A method as claimed in claim 1 wherein the reservoir is penetrated by at least one injection well and at least one production well and oil is recovered from the reservoir via the production well.

3. A method as claimed in claim 2 wherein an aqueous drive fluid is injected into the reservoir to sweep the aqueous displacement fluid through the reservoir to the production well.

4. A method as claimed in claim 3 wherein the aqueous base fluid has a TDS of at least 20,000 ppmv and the aqueous drive fluid has a density that is less than 0.199 g/cm$^3$ higher than the aqueous base fluid.

5. A method as claimed in claim 1 wherein, after injection of the aqueous displacement fluid into the reservoir, the injection well is switched from injection to production and oil is recovered from the reservoir via the injection well.

6. A method as claimed in claim 1 wherein the aqueous displacement fluid is injected into the reservoir in secondary recovery mode or in tertiary recovery mode.

7. A method as claimed in claim 1 wherein at least 90% of the dissolved solids in the aqueous base fluid are selected from Group IA metal cations, Group IIA metal cations and halide anions (based on the Ionic Strength of the aqueous base fluid).

8. A method as claimed in claim 1 wherein the aqueous base fluid has a total dissolved solids concentration of at least 1,000 ppmv.

9. A method as claimed in claim 1 wherein the aqueous base fluid has a density in the range of 1.000 to 1.210 g/cm$^3$ at standard temperature and pressure.

10. A method as claimed in claim 1 wherein the aqueous base fluid comprises a water-miscible co-solvent in an amount of less than 5% by volume.

11. A method as claimed in claim 1 wherein the feed water is selected from seawater, estuarine water, brackish water, produced water, and aquifer water.

12. A method as claimed in claim 1 wherein an acid is added to the aqueous base fluid either before or after the addition of the zinc salt.

13. A method as claimed in claim 12 wherein the pH of the aqueous displacement fluid is maintained above a value of 3 and below a value of 7.

14. A method as claimed in claim 12 wherein the pH of the aqueous displacement fluid is maintained above a value of 4 and below a value of 6.5.

15. A method as claimed in claim 1 wherein an acid and the zinc salt are added simultaneously to the aqueous base fluid.

16. A method as claimed in claim 1 wherein at least 50% by weight of the dissolved solids in the aqueous base fluid are sodium cations and chloride anions (based on the Ionic Strength of the aqueous base fluid).

17. A method as claimed in claim 16 wherein the molar ratio of dissolved chloride to dissolved zinc in the aqueous displacement fluid is at least 5:1.

18. A method as claimed in claim 16 wherein the molar ratio of dissolved chloride to dissolved zinc in the aqueous displacement fluid is at least 10:1.

19. A method as claimed in claim 16 wherein the molar ratio of dissolved chloride to dissolved zinc in the aqueous displacement fluid is at least 100:1.

20. A method as claimed in claim 1 wherein the ratio of the Ionic Strength of the aqueous displacement fluid to the molar concentration of dissolved zinc is at least 5:1 (based on the dissolved solids being in the form of free ions).

21. A method as claimed in claim 1 wherein the aqueous displacement fluid is injected into the reservoir in a low pore volume amount in the range of 0.35 to less than 1 PV.

22. A method as claimed in claim 1 wherein the aqueous displacement fluid has a concentration of dissolved zinc in the range of 100 to 1000 ppmv.

23. A method as claimed in claim 1 wherein a viscosified aqueous displacement fluid is injected into the reservoir wherein the viscosified aqueous displacement fluid is formed by either dosing a viscosifying agent and a zinc salt into the aqueous base fluid or by dosing a viscosifying agent into the aqueous displacement fluid and the resulting viscosified aqueous displacement fluid has a viscosity at reservoir conditions in the range of 1 to 40 cP.

24. A method as claimed in claim 1 wherein at least 95% of the dissolved solids in the aqueous base fluid are selected from Group IA metal cations, Group IIA metal cations and halide anions (based on the Ionic Strength of the aqueous base fluid).

25. A method as claimed in claim 1 wherein at least 98% of the dissolved solids in the aqueous base fluid are selected from Group IA metal cations, Group IIA metal cations and halide anions (based on the Ionic Strength of the aqueous base fluid).

26. A method as claimed in claim 1 wherein the aqueous base fluid has a total dissolved solids concentration of at least 10,000 ppmv.

27. A method as claimed in claim 1 wherein the aqueous base fluid comprises a water-miscible co-solvent in an amount of less than 1% by volume.

28. A method as claimed in claim 1 wherein at least 60% by weight of the dissolved solids in the aqueous base fluid are sodium cations and chloride anions (based on the Ionic Strength of the aqueous base fluid).

29. A method as claimed in claim 1 wherein the ratio of the Ionic Strength of the aqueous displacement fluid to the molar concentration of dissolved zinc is at least 10:1 (based on the dissolved solids being in the form of free ions).

30. A method as claimed in claim 1 wherein the ratio of the Ionic Strength of the aqueous displacement fluid to the molar concentration of dissolved zinc is at least 100:1 (based on the dissolved solids being in the form of free ions).

31. A method as claimed in claim 1 wherein the aqueous displacement fluid is injected into the reservoir in a low pore volume amount in the range of 0.4 to less than 0.9 PV.

32. A method as claimed in claim 1 wherein the aqueous displacement fluid is injected into the reservoir in a low pore volume amount in the range of 0.4 to less than 0.8 PV.

33. A method as claimed in claim 1 wherein the aqueous displacement fluid is injected into the reservoir in a low pore volume amount in the range of 0.4 to less than 0.7 PV.

34. A method as claimed in claim 1 wherein the aqueous displacement fluid is injected into the reservoir in a low pore volume amount in the range of 0.4 to less than 0.6 PV.

35. A method as claimed in claim 1 wherein the aqueous displacement fluid is injected into the reservoir in a low pore volume amount in the range of 0.5 to less than 0.6 PV.

36. A method as claimed in claim 1 wherein the aqueous displacement fluid has a concentration of dissolved zinc in the range of 100 to 750 ppmv.

37. A method as claimed in claim 1 wherein the aqueous displacement fluid has a concentration of dissolved zinc in the range of 100 to 500 ppmv.

38. A method as claimed in claim 1 wherein a viscosified aqueous displacement fluid is injected into the reservoir wherein the viscosified aqueous displacement fluid is formed by either dosing a viscosifying agent and a zinc salt into the aqueous base fluid or by dosing a viscosifying agent into the aqueous displacement fluid and the resulting viscosified aqueous displacement fluid has a viscosity at reservoir conditions in the range of 1.5 to 30 cP.

39. A method as claimed in claim 1, wherein the reservoir is penetrated by the at least one injection well and at least one production well, wherein the method further comprises:
   injecting an aqueous drive fluid into the reservoir after injecting the aqueous displacement fluid;
   sweeping the aqueous displacement fluid through the reservoir to the at least one production well using the aqueous drive fluid, wherein oil is recovered from the reservoir via the at least one production well in response to sweeping the aqueous displacement fluid through the reservoir using the aqueous drive fluid.

40. A method as claimed in claim 39, wherein the aqueous drive fluid does not contain any added zinc.

* * * * *